Aug. 21, 1951     C. A. WINSLOW ET AL     2,565,445

FILTER

Filed Sept. 16, 1946     2 Sheets-Sheet 1

INVENTORS
CHARLES A. WINSLOW
WILLIAM G. NOSTRAND
LAURENCE L. MOORE
BY
ATTORNEY

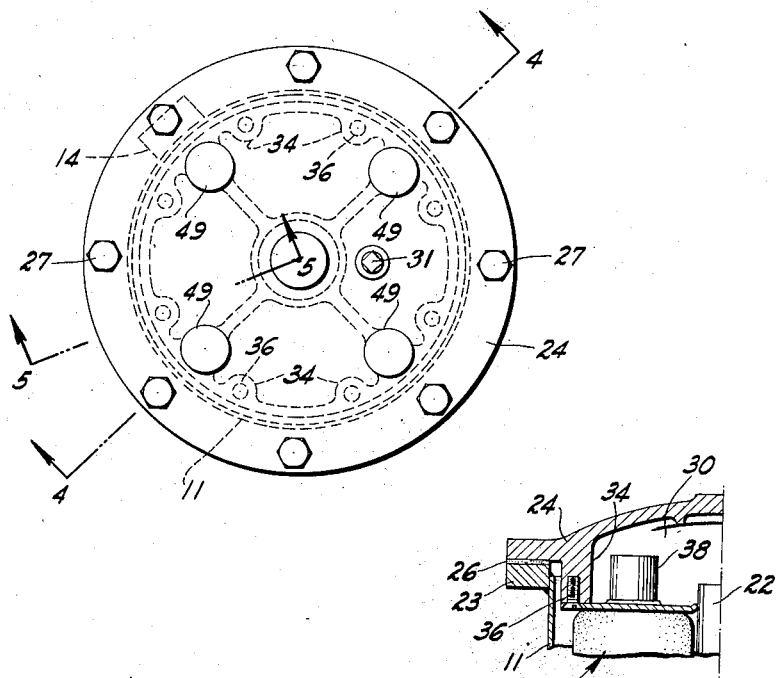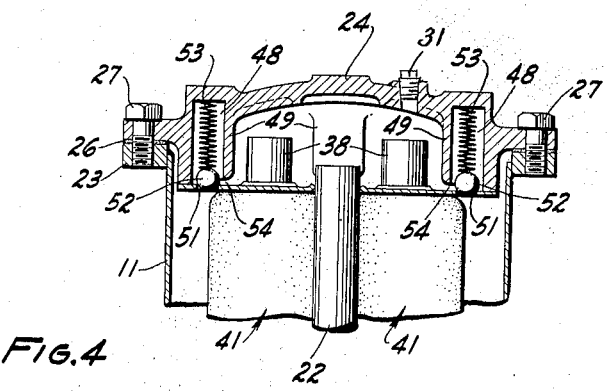

Patented Aug. 21, 1951

2,565,445

UNITED STATES PATENT OFFICE

2,565,445

FILTER

Charles A. Winslow, William G. Nostrand, and Laurence L. Moore, Oakland, Calif., assignors to Winslow Engineering Co., Oakland, Calif., a partnership Application September 16, 1946, Serial No. 697,222

4 Claims. (Cl. 210—184)

This invention relates to filtering apparatus and, more particularly, to filtering units comprising a number of replaceable filtering elements contained within a housing for filtering fluid fed into the housing under pressure through one conduit, the filtrate being discharged from the housing through a second conduit, and the residue being retained on or in the filtering elements until they are removed and replaced by clean elements.

Filtering units of the type to which the invention relates find wide usage in association with various types of machines, particular internal combustion engines, for filtering sludge, grit, and other deleterious matter from lubricating oil employed in a circulating oil system. Aside from certain limitations on the life and effectiveness of the individual filtering elements, filtering units of this general type employed heretofore have possessed a number of disadvantages that seriously impair their suitability for many types of uses and that have even been responsible in numerous instances for extensive damage to machines with which they are associated. For example, it has been customary to employ check valves in these filtering units to by-pass unfiltered lubricant around the filtering elements when they become clogged in order to insure an uninterrupted flow of lubricant through the unit. These check valves were so placed in the units that large quantities of sludge present in the unfiltered lubricant tended to accumulate in and around the valve passages. When the valves opened in response to excessive pressure developed in the unfiltered lubricant chamber of the units, the surge of fluid through the valves frequently carried slugs or globules of sludge out of the units through the outlet conduits. In cases where the outlet conduits supplied lubricant directly to bearings and the like, sludge passing through the check valves in the manner described was apt to be fed directly onto the lubricated surfaces, thereby greatly accelerating their rate of wear.

Another common deficiency of prior filtering units having a large chamber for receiving lubricant to be filtered was that the lubricant tended to drain through the filtering elements and the outlet conduits or back out of the outlet conduits, ultimately flowing into the crankcase or other reservoir in the associated machine during periods when the machine was not in operation, thereby temporarily raising the lubricant level in the reservoir. If the machine operator checked the lubricant level in the reservoir before placing the machine back in operation, he would get one reading on the lubricant gage, whereas, if he had checked the level immediately after the machine was stopped and before lubricant could drain out of the filtering unit in quantity, he would have gotten a substantially smaller reading on the lubricant gage. The higher reading was not representative of operating conditions, and operators were frequently deceived thereby into believing an adequate supply of lubricant was present when such was not actually the case. As a result of such errors, machines frequently were operated without sufficient lubricant, with disastrous results.

Another objectionable feature of prior filtering units of the general type to which this invention relates was that the examination and replacement of filtering elements was difficult without removing the entire unit from its mounting or handling the coated and saturated filtering elements individually during their removal from the unit.

It is an object of the present invention to provide a filtering unit of the general type described having a greatly decreased tendency for slugs or globules of filterable material to by-pass the filtering elements and pass out of the unit through the outlet conduit.

Another object of the invention is to provide a filtering unit of the general type described from which fluid will not drain by gravity back into the fluid system with which the unit is employed when the supply of fluid to be filtered is cut off, as by stopping operation of a machine served by the unit.

Another object of the invention is to provide a filtering unit of the general type described in which the various filtering elements are mounted for easy removal as a single unit without the necessity for handling the filtering elements individually and without having to remove the entire unit from its mounting.

Another object of the invention is to provide a filtering unit of the general type described that is simple in construction, inexpensive to manufacture, and efficient in operation.

Still other objects and advantages of the invention will become apparent from the following detailed description of a preferred embodiment thereof, selected for illustrative purposes, and from the accompanying drawings. The particular embodiment of the invention employed for illustrative purposes is one specially designed for filtering lubricating oil in mobile Diesel engine plants, such as those employed to power large trucks, busses, tractors, and other vehicles, but it is to be understood that the invention is not limited physically to the precise structural details disclosed and is not limited in its utility to association with machines such as those named or to the filtering only of lubricating oil.

Referring now to the accompanying drawings—

Fig. 3 is a plan view of the filtering unit;

Fig. 4 is a vertical sectional view of a portion of the filtering unit, the plane of the section being indicated by the line 4—4 in Fig. 3; and Fig. 5 is another vertical sectional view of a portion of the filtering unit, the plane of the section being indicated by the line 5—5 in Fig. 3.

Figure 2:
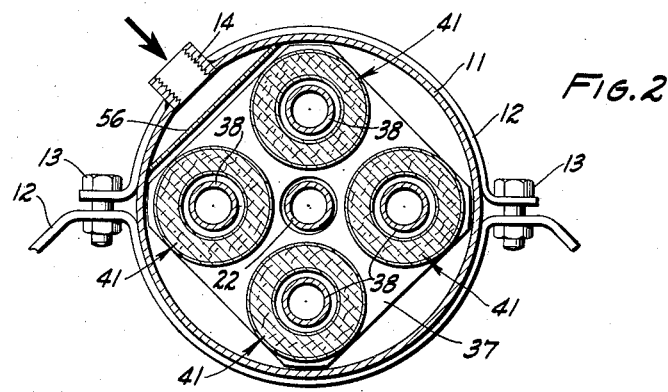
Fig. 2 is a horizontal sectional view of the filtering unit, the plane of the section being indicated by the line 2—2 in Fig. 1.
Figure 1:
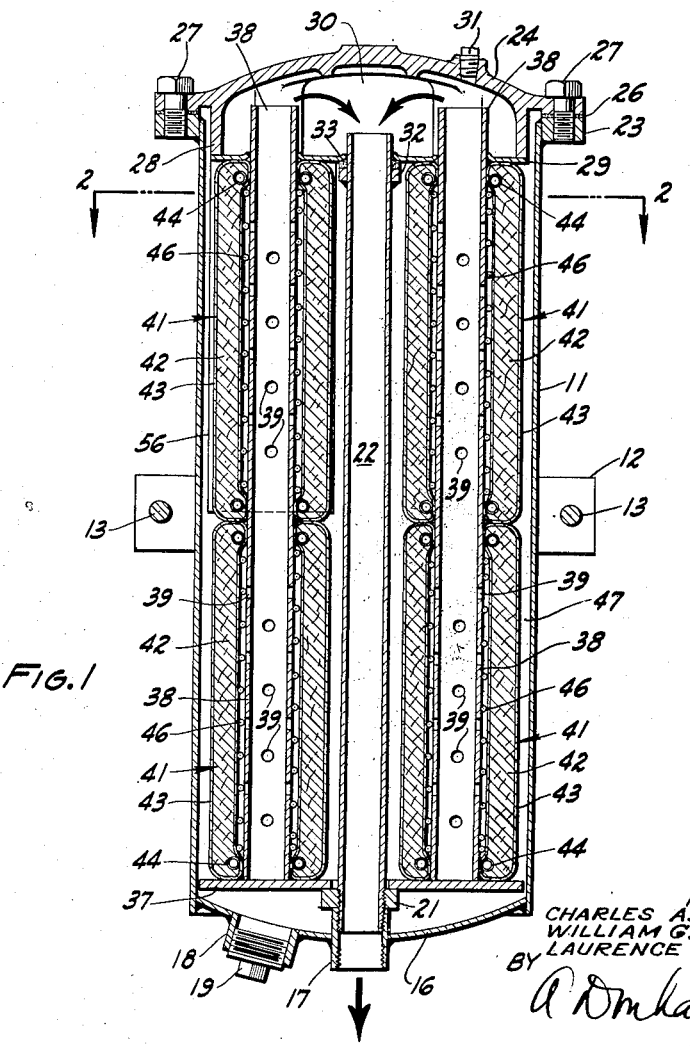
Fig. 1 is a vertical sectional view of a filtering unit, the filtering elements contained therein being illustrated somewhat schematically.

The filtering unit shown in the drawings is contained in a housing 11, preferably having the form of a circular cylinder, though a wide variety of cylindrical shapes may be employed as may be dictated by space limitations or other considerations. The housing may be mounted in association with other equipment or machinery in any convenient manner, as, for example, by means of a bracket 12 adapted to be clamped tightly around the housing 11 by a plurality of fastening elements 13. Oil to be filtered is admitted into the housing 11 through an opening defined by a hollow boss 14, preferably located near the top of the housing. The bottom of the housing is closed by an integrally formed, dished wall 16, in which may be mounted a hollow boss 17 defining an outlet opening for filtered oil and another hollow boss 18 defining an opening for use in washing accumulated sludge and grit out of the housing. The latter opening is normally closed by a removable plug 19.

The inner end of the hollow boss 17 extends a short distance into the housing 11 and terminates in an outwardly extending annular flange 21, that serves a purpose described hereinafter. The inwardly projecting length of the boss 17 is internally threaded to receive and secure one end of an outlet conduit 22 that extends axially up through the housing 11 into close proximity with the upper end thereof.

The upper end of the housing 11 is provided with an outwardly extending, annular flange 23; and a cap 24, most conveniently formed as a metal casting, closes the upper end of the housing and is secured to the flange 23, with a suitable sealing gasket 26 interposed therebetween, by means of a number of bolts 27. An integrally formed, cylindrical portion 28 of the cap 24 projects a short distance downwardly inside the housing 11 and engages a plate 29 that cooperates with the cap 24 to define a relatively small upper chamber 30 therebetween. A small vent hole 31 is preferably provided in the cap 24 leading into the upper chamber 30.

The plate 29 is centrally apertured so that the outlet conduit 22 may project upwardly therethrough and a short distance into the upper chamber 30, the outlet conduit being provided with an outwardly projecting, annular flange 32 supporting an annular sealing gasket 33, that in turn bears upwardly against the plate 29 for preventing leakage around the outlet conduit where it passes through the plate 29.

The cylindrical portion 28 of the cap 24 is provided with a number of circumferentially spaced apart lugs 34 around its inner periphery, the lugs being drilled and tapped to receive respective screws 36. The plate 29 is apertured at appropriate points around its periphery so that the screws 36 may be passed through the apertures and threaded into the lugs 34 for holding the plate tightly against the portion 28 of the cap. Thus, removal of the bolts 27 permits the cap 24 and the plate 29 to be lifted from the housing to give access to the interior thereof for installing or removing the filtering structure now to be described.

The filtering structure contained within the housing 11 consists of an assembly that may be installed and removed as a unit. This assembly comprises a plate 37, that may be of any convenient configuration adapted to drop freely into the housing 11. The plate 37 is centrally apertured for loosely encompassing the outlet conduit 22, the aperture being sufficiently small, however, so that this plate may rest upon and be supported by the flange 21 on the outlet boss 17. A plurality of tubes or pipes 38, four being employed in this instance, are disposed in uniformly spaced apart relation about and parallel to the central outlet conduit 22, and the lower ends of the tubes are rigidly secured to the plate 37, as by welding, so that these ends of the tubes are closed by this plate. The walls of the tubes 38 are provided with numerous small apertures or perforations 39 through which filtered oil may flow into the tubes, and the upper ends of these tubes project with snug sliding fits through suitable registering apertures in the plate 29 and extend into the upper chamber 30 for discharging filtered oil into this chamber. Preferably, the upper ends of the tubes 38 terminate somewhat above the upper end of the outlet conduit 22.

Each of the perforated tubes 38 is surrounded for the full portion of its length below the plate 29 by one or more elongated, annular, filtering elements 41, both end portions of each such element being held snugly around the tube on which it is mounted and the elements being slightly compressed longitudinally between the two plates 29 and 37. A suitable filtering element for this purpose may comprise a core of fibrous filtering material 42, intermixed with any desired oil purifying material; a porous, knitted fabric, covering material 43 wrapped around the inside, outside, and ends of the core; a pair of snap springs 44 enclosed in the opposite ends of the fabric covering for holding the ends of the element in engagement with the tube 38 on which it is mounted; and a helical spring spacer coil 46 inserted inside the fabric covered core to maintain a desired space between the inner surface of the element and the perforated tube 38; the whole being assembled in the manner disclosed in U. S. Patent No. 2,314,640, issued March 23, 1943. Filtering elements properly fabricated as taught in the above-mentioned patent are somewhat flexible and normally grow in volume as deleterious substances are collected and absorbed within the bodies of the elements. The snap springs 44 may be simple helical springs having their opposite ends hooked together to form constricting rings for holding the end portions of the elements in more or less sealing engagement with the tubes 38.

The above-described filtering structure may be assembled with a suitable number of filtering elements 41 before it is inserted into the housing 11, and, similarly, it may readily be lifted out of the housing for cleaning the interior thereof and replacing used filtering elements with new ones. Under normal operating conditions, oil is pumped under pressure to the filtering unit through a suitable conduit (not shown) and is introduced into the housing 11 through the inlet opening in the boss 14 until the main chamber 47 is filled with oil. As the oil pressure within the main chamber 47 rises, the oil is forced through the bodies of the several filtering elements 41, leaving deleterious material formerly suspended in the oil deposited on the outer surfaces and within the cores of the filtering elements. On being forced through the filtering elements 41, the filtered oil flows through the perforations 39 in the tubes 38; and when these tubes are full, the filtered oil flows upwardly therein and out of their upper ends into the upper chamber 30. As the oil level in the upper chamber 30 reaches the upper end of the outlet conduit 22, it flows down this conduit and out of the outlet opening in the boss 17, from where it may be conducted by gravity through any suitable conduit (not shown) to surfaces to be lubricated or to a filtered oil reservoir.

To provide for maintaining a continuous flow of oil through the filtering unit in the event the filtering elements 41 should become too clogged with sludge to permit normal flow therethrough, one or more check valves should be incorporated in the unit to by-pass unfiltered oil from the main chamber 47 directly into the upper chamber 30. In the present case, four such check valves, of more or less conventional design, are built into the cap 24. These valves may be housed within suitable cavities 48 defined by hollow bosses 49 formed integrally with the cylindrical portion 28 of the cap 24, the valve cavities being partially closed by the plate 29. An aperture 51 for each valve is provided in the plate 29 to form a port against which a ball 52 is normally seated, the ball being urged toward its seat with a predetermined force by a helical spring 53. A gap 54 between the inner portion of each boss 49 and the plate 29 permits oil passing through the ports 51 to flow freely into the upper chamber 30. Thus, when the pressure of unfiltered oil in the main chamber 47 exceeds a value determined by the strength of the springs 53, unfiltered oil is permitted to flow upwardly through the check valves and into the upper chamber 30, thereby compensating for any reduction or interruption in the flow of oil through the filtering elements 41.

The particular check valve arrangement disclosed has two principal advantages. Firstly, the valves are located at the very top of the body of unfiltered oil in the main chamber 47 so that sludge and grit are not inclined to settle in and around the valve ports 51; and secondly, the valve ports 51 merely comprise holes drilled through the plate 29 so that there are no protuberances or irregularities tending to catch and hold sludge or grit where it can be washed through these ports. The small distance that the upper end of the outlet conduit 22 projects above the bottom of the upper chamber 30 provides some additional protection against the possibility of slugs or globules of solid material flowing into the outlet conduit, a sufficient oil depth being maintained in the upper chamber for such slugs or globules to settle and accumulate therein if they should happen to pass through the check valves.

Since both the inlet opening for introducing unfiltered oil into the unit and the outlet for filtered oil leaving the chamber 30 are disposed adjacent the top of the unit, it is obvious that only an insignificant portion of the total oil content of the unit can flow therefrom by gravity when the supply of unfiltered oil ceases incident to stopping operation of machinery with which the unit is associated. This effectively avoids all danger of the type of false oil level readings described hereinbefore.

Because the unfiltered oil inlet is disposed closely adjacent the check valve ports 51, a baffle 56 is preferably mounted in the main chamber 47 so that its upper edge abuts the plate 29 and its side edges abut the wall of the housing 11, the baffle being so positioned with respect to the inlet for unfiltered oil that the incoming stream is directed downwardly for a substantial distance. This minimizes turbulence in the vicinity of the check valve ports 51 which might otherwise tend to carry suspended solid material through these ports when the check valves are open.

From the foregoing description of a preferred embodiment of the invention and its mode of operation, it will be appreciated that a filtering unit has been provided that is simple and economical to manufacture, is simple to service while in use, and yet provides maximum protection against the dangers described hereinbefore. While this disclosure has been made by describing a specific embodiment of the invention in detail, it will also be appreciated that the novel features of the invention are capable of taking a variety of specific forms and of being used in performing numerous types of filtering operations without departing from the true scope of the invention as defined in the appended claims.

We claim:

1. A liquid filtering unit comprising a cylindrical housing having an open upper end, an inlet adjacent thereto, a closed lower wall and an outlet opening therethrough; a conduit secured at its lower end around said outlet opening and extending vertically upward therefrom; a plate in said housing above said lower wall, said plate having an aperture therethrough to provide a detachable slip joint around said conduit; a plurality of perforated tubes secured at their lower, closed end to said plate and extending vertically upwards therefrom; a corresponding plurality of tubular filtering elements surrounding each of said tubes whereby liquid passing into said housing is filtered into said tubes; a second plate closing the upper end of said housing, said plate having a plurality of apertures to provide detachable slip joints around said conduit and said tubes, and a cap, secured to said housing above said second plate and recessed to provide space therebetween, whereby filtered liquid passes from said tubes into said space and then out through said conduit.

2. The filtering unit claimed in claim 1 in which there is a bypass means adjacent said inlet to pass unfiltered liquid from the space between said plates into the space above said second plate when the liquid pressure exceeds a predetermined amount, and in which there is a baffle in said housing adjacent said inlet between said inlet and said by-pass means to deflect liquid so that it will not pass directly from said inlet through said bypass.

3. A liquid filter comprising a cylindrical casing having an inlet near its upper, open end and an outlet through its bottom wall; a removable hollow cap closing said upper end, said cap having a lower wall; a central outlet conduit fixed to said casing at its outlet and extending axially upward from said outlet into said hollow cap, the connection between the lower wall of said hollow cap and said conduit comprising a detachable slip joint; a filter element support plate within said casing at its lower end and supported around said outlet conduit by a detachable slip joint; a plurality of perforated tubes permanently fixed to said plate and closed at their ends thereby, and extending vertically upward therefrom into said cap higher than said outlet conduit, the connection between each of said tubes and the lower wall of said hollow cap comprising detachable slip joint; and a removable filter element around each said tube, whereby the filter assembly comprising said plate, tubes, and filter elements may be removed from said casing as a unit for replacement of the filter elements.

4. The filtering unit claimed in claim 3 in which there is a bypass means adjacent said inlet to pass unfiltered liquid into said hollow cap when the liquid pressure exceeds a predetermined amount and in which there is a baffle in said housing adjacent said inlet between said inlet and said by-pass means to deflect liquid so that it will not pass directly from said inlet through said by-pass.

CHARLES A. WINSLOW.
WILLIAM G. NOSTRAND.
LAURENCE L. MOORE.

REFERENCES CITED

The following references are of record in the file of this patent:

UNITED STATES PATENTS

| Number | Name | Date |
| --- | --- | --- |
| 655,841 | Watson et al. | Aug. 14, 1900 |
| 1,203,835 | Zahm | Nov. 7, 1916 |
| 1,734,325 | Cannon | Nov. 5, 1929 |
| 1,992,101 | Stuart | Feb. 19, 1935 |
| 2,057,932 | Balser | Oct. 20, 1936 |
| 2,108,087 | Thayer | Feb. 15, 1938 |
| 2,113,923 | Miller | Apr. 12, 1938 |
| 2,261,098 | Wicks | Oct. 28, 1941 |
| 2,280,033 | Aldham | Apr. 14, 1942 |
| 2,294,262 | Wilkinson | Aug. 25, 1942 |
| 2,345,848 | Winslow et al. | Apr. 4, 1944 |
| 2,374,976 | Briggs et al. | May 1, 1945 |
| 2,390,494 | Briggs et al. | Dec. 11, 1945 |
| 2,406,308 | Vokes et al. | Aug. 20, 1946 |
| 2,429,321 | Brecque | Oct. 21, 1947 |